United States Patent
Minohara et al.

(10) Patent No.: US 11,712,050 B2
(45) Date of Patent: *Aug. 1, 2023

(54) FEEDSTUFFS FOR RUMINANTS

(71) Applicant: NIPPON PAPER INDUSTRIES CO., LTD., Tokyo (JP)

(72) Inventors: Taisuke Minohara, Tokyo (JP); Kana Sato, Tokyo (JP); Hiroshi Shinkura, Tokyo (JP); Kazuhiro Kurosu, Tokyo (JP); Takeshi Iimori, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 233 days.

This patent is subject to a terminal disclaimer.

(21) Appl. No.: 16/326,820

(22) PCT Filed: Aug. 25, 2017

(86) PCT No.: PCT/JP2017/030565
§ 371 (c)(1),
(2) Date: Feb. 20, 2019

(87) PCT Pub. No.: WO2018/038258
PCT Pub. Date: Mar. 1, 2018

(65) Prior Publication Data
US 2019/0174794 A1    Jun. 13, 2019

(30) Foreign Application Priority Data
Aug. 26, 2016   (JP) .................. 2016-165478

(51) Int. Cl.
*A23K 50/10*   (2016.01)
*A23K 10/32*   (2016.01)
*A23K 40/20*   (2016.01)

(52) U.S. Cl.
CPC .............. *A23K 10/32* (2016.05); *A23K 40/20* (2016.05); *A23K 50/10* (2016.05)

(58) Field of Classification Search
CPC ......... A23K 10/32; A23K 40/10; A23K 50/10
See application file for complete search history.

(56) References Cited

U.S. PATENT DOCUMENTS

| 2001/0023749 A1 | 9/2001 | Nay et al. |
| 2002/0006425 A1* | 1/2002 | Takaoka ................ A61L 9/01 |
| | | 424/405 |

(Continued)

FOREIGN PATENT DOCUMENTS

| JP | 1998-75719 A | 3/1998 |
| JP | 2011-83281 A | 4/2011 |

(Continued)

OTHER PUBLICATIONS

English language machine translation of JP 2015198653 (Year: 2015).*

(Continued)

*Primary Examiner* — W A Moore
(74) *Attorney, Agent, or Firm* — McCarter & English, LLP; Steven G. Davis; Wei Song

(57) ABSTRACT

The present invention aims to provide feedstuffs for ruminants with high nutritional value capable of promoting rumination.
According to the present invention, feedstuffs for ruminants containing a kraft pulp derived from a lignocellulosic material are provided, wherein the kraft pulp has a Canadian standard freeness of 400 ml or more.

14 Claims, 1 Drawing Sheet

(56) References Cited

U.S. PATENT DOCUMENTS

| | | | |
|---|---|---|---|
| 2009/0298149 A1* | 12/2009 | Wang | C08H 8/00 |
| | | | 435/165 |
| 2010/0281767 A1 | 11/2010 | Zeeck | |
| 2011/0250638 A1* | 10/2011 | Sjoede | D21C 1/04 |
| | | | 435/68.1 |
| 2012/0180964 A1* | 7/2012 | Heinricher | D21H 11/12 |
| | | | 162/94 |
| 2012/0301598 A1* | 11/2012 | Karges | A23K 40/20 |
| | | | 426/624 |
| 2013/0011885 A1 | 1/2013 | Binder et al. | |
| 2013/0280762 A1* | 10/2013 | Dale | C10L 5/363 |
| | | | 435/72 |
| 2015/0017313 A1* | 1/2015 | Zeeck | F23K 3/00 |
| | | | 426/623 |
| 2015/0147796 A1 | 5/2015 | Bonde | |
| 2016/0228539 A1* | 8/2016 | Nelson | A61K 8/9794 |
| 2019/0183143 A1 | 6/2019 | Minohara et al. | |

FOREIGN PATENT DOCUMENTS

| | | |
|---|---|---|
| JP | 2013-518880 A | 5/2013 |
| JP | 2015-198653 A | 11/2015 |
| WO | 2011/097075 A2 | 8/2011 |

OTHER PUBLICATIONS

English language translation of JP 2015198653; JP 2015198653 published on Nov. 12, 2015 (Year: 2015).*

International Search Repor for Application No. PCT/JP2017/030526, dated Nov. 28, 2017, 1 page.

International Search Repor for Application No. PCT/JP2017/030565, dated Nov. 7, 2017, 2 pages.

* cited by examiner

[Figure 1]
[Figure 2]

FEEDSTUFFS FOR RUMINANTS

CROSS-REFERENCE TO RELATED APPLICATIONS

This application is a U.S. national stage filing, under 35 U.S.C. § 371(c), of International Application No. PCT/JP2017/030565, filed on Aug. 25, 2017, which claims priority to Japanese Patent Application No. 2016-165478, filed on Aug. 26, 2016. The entire contents of each of the aforementioned applications are incorporated herein by reference.

TECHNICAL FIELD

The present invention relates to feedstuffs for ruminants and processes for preparing them.

BACKGROUND ART

Generally in the field of livestock farming, concentrate feedstuffs with high nutritional value are often used in combination with roughage feedstuffs such as forages in order to increase milk production or to increase weight gain in livestock.

Concentrate feedstuffs are rich in easily digestible carbohydrates (starch and the like) such as maize, cereal grains and soybean, while roughage feedstuffs mainly include dried forages (hay, straw), early harvested and fermented (i.e., ensiled) forages and the like.

Ruminants can ingest and digest roughage feedstuffs because they have a rumen (first stomach). The rumen occupies the largest volume among the multiple stomachs of ruminants, and contains a rich diversity of microorganisms (i.e., ruminal microorganisms) capable of degrading hard-to-digest polysaccharides such as celluloses and hemicelluloses in roughage feedstuffs (ruminal fermentation).

However, celluloses and hemicelluloses in roughage feedstuffs are often bound to lignins and exist as lignin-cellulose complexes and lignin-hemicellulose complexes, respectively. Such complexes may not be degraded sufficiently by ruminal fermentation, and therefore, roughage feedstuffs had the drawback that they tended to have insufficient feed efficiency. Moreover, an increase in undigested materials was considered to be environmentally undesirable because it leads to an increase in feces.

In addition, the supply of roughage feedstuffs is unstable because it is susceptible to the harvest yield or crop yield of forages. Especially, Japan mostly relies on imported roughage feedstuffs, which are generally subject to significant price variation or may be difficult to import depending on circumstances in exporting countries, thereby putting a squeeze on livestock farmers.

Thus, it would be desirable to provide inexpensive and stably available feedstuffs for ruminants with high feed efficiency that can substitute for forages.

In this connection, concentrate feedstuffs rich in easily digestible carbohydrates (starch) are typically combined with roughage feedstuffs to increase nutrient levels in feedstuffs. To maintain milk production in dairy livestock or to maintain weight gain in livestock for meat, feed intake must also be increased because the rate of increase in the energy required to increase milk production or weight gain exceeds the rate of increase in feed intake. However, carbohydrates such as starch in concentrate feedstuffs may cause a sudden drop of pH in the first stomach (rumen), resulting in ruminal acidosis. Ruminal acidosis is one of ruminant diseases caused by a sudden intake of cereal grains, concentrate feedstuffs, fruits or the like rich in carbohydrates. Ruminal acidosis is caused by the growth of gram-positive lactate-producing bacteria, especially *Streptococcus bovis* and microorganisms of the genus *Lactobacillus*, which results in abnormal accumulation of lactic acid or volatile fatty acids (VFAs) in the rumen, whereby the pH in the rumen drops (to pH 5 or less). This results in decreased numbers or disappearance of protozoa and certain types of bacteria in the rumen. Especially, acute acidosis is very critical because it leads to congestion of the rumen or dehydration (a shift of a lot of body fluids into the stomach due to an increase in the osmotic pressure in the stomach lumen), and eventually coma or death.

To prevent ruminal acidosis, it is important to avoid sudden changes in feed formulations, thereby stabilizing ruminal fermentation and reducing pH variations. It is also important to provide feedstuffs that stimulate adequate rumination to promote salivation because saliva contains sodium bicarbonate contributing to pH adjustment. However, feedstuffs with reduced nutritional value for preventing ruminal acidosis raise concerns of decreased milk production due to energy shortage.

Feedstuffs for preventing ruminal acidosis are disclosed in PTL 1, which describes livestock feedstuffs obtained by applying a high impact force to a wood raw material to break up it into microparticles. As for pelletized feedstuffs, PTL 2 proposes to prepare feedstuffs by pelletizing food processing residues. PTL 3 also describes pelletizing a lignocellulosic biomass to prepare a feedstuff for ruminants (JPA 2013-518880). Further, PTL4 describes pelletizing a kraft pulp having a kappa number of 90 or less to prepare a feedstuff for ruminants.

CITATION LIST

Patent Literature

PTL 1: JPA2011-083281
PTL 2: JPA1998-75719
PTL 3: International Publication WO2011/097075
PTL 4: JPA2015-198653

SUMMARY OF INVENTION

Technical Problem

It is generally known that when higher proportions of concentrate feedstuffs such as maize are given, the fat content of milk or the marbling degree increases because they have high fermentability, and therefore high nutritional value, but ruminal acidosis occurs or various metabolic disorders or reproductive diseases occur before and after delivery due to reduced stimulation of rumination.

On the other hand, it is contemplated that feedstuffs should be provided in the form of pellets or the like for easy handling of the feedstuffs. However, too soft pellets are difficult for ruminants to eat as a matter of course but also sometimes they are broken or give off dust during transportation. Especially, it is difficult to prepare hard pellets from extensively delignified pulps such as kraft pulps because they contain low levels of thermoplastic lignins.

Thus, the present invention aims to provide feedstuffs for ruminants with high nutritional value capable of promoting rumination.

Solution to Problem

As a result of careful studies about the problems described above, the inventors of the present invention accomplished the present invention on the basis of the finding that feedstuffs capable of promoting rumination in ruminants can be prepared by incorporating a kraft pulp having a Canadian standard freeness adjusted to 400 ml or more.

(1) A feedstuff for ruminants containing a kraft pulp derived from a lignocellulosic material, wherein the kraft pulp has a Canadian standard freeness of 400 ml or more.
(2) The feedstuff of (1) wherein the kraft pulp has a Canadian standard freeness of 400 ml or more and 600 ml or less.
(3) The feedstuff of (1) or (2) wherein the kraft pulp has a kappa number of 5 to 15.
(4) The feedstuff of any one of (1) to (3) wherein the lignocellulosic material comprises a wood material.
(5) The feedstuff of any one of (1) to (4), which is in the form of a pellet or a sheet.
(6) The feedstuff of any one of (1) to (4), which is in the form of a pellet.
(7) The feedstuff of (6) wherein the pellet has a mechanical durability of 97.5% by mass or more and a diameter of 3 to 10 mm.
(8) The feedstuff of any one of (1) to (4), which has a bulk density of 0.3 to 0.65 g/cm$^3$ as determined according to JIS Z 7302-9.
(9) A process for preparing the feed pellet of any one of (5) to (8), comprising pressing/compressing a kraft pulp having a moisture content of 15 to 35% by mass to pelletize it.
(10) A process for preparing the feed pellet of any one of (5) to (8), comprising pressing/compressing a kraft pulp having a bulk density of 0.30 to 0.65 g/cm$^3$ and a moisture content of 10 to 70% by mass to pelletize it.

Advantageous Effects of Invention

The present invention makes it possible to obtain feedstuffs capable of promoting rumination in ruminants and highly preferred by ruminants. Especially, the present invention makes it possible to obtain feedstuffs capable of promoting rumination in ruminants, which are highly preferred by ruminants and assume the form of easy-to-handle pellets. Further, the feed pellets for ruminants according to the present invention can be stably supplied because they can be prepared from lignocellulosic raw materials such as wood.

BRIEF DESCRIPTION OF DRAWINGS

FIG. 1 is a photograph showing the appearance of feed pellets prepared in Experiment 1 (Sample 3).
FIG. 2 is a photograph showing the appearance of a flaky feedstuff prepared in Experiment 3 (Sample 3-1).

DESCRIPTION OF EMBODIMENTS

Feedstuffs

The feedstuffs for ruminants according to the present invention are applied to ruminants. Ruminants include, for example, cattle such as dairy cattle and beef cattle, sheep, goats and the like. The time at which the feedstuffs of the present invention are fed to the ruminants, i.e., the age, size, health condition or the like of the ruminants of interest is not specifically limited, and they may be applied, for example, from suckling calves to adult cattle.

In one embodiment, the feedstuffs for ruminants according to the present invention can assume the form of pellets. The feed pellets of the present invention have a hardness enough to resist breakage and powdering during transportation, and preferably have a mechanical durability of 97.5% or more (as determined according to "6.5 Testing Methods of Mechanical Durability" defined in the Wood Pellet Quality Standards). The mechanical durability is an indication of the unlikelihood that pellets would break, and refers to the percentage of the mass of pellets that did not break into powder when a given amount of mechanical impact was applied. In preferred embodiments, the feed pellets of the present invention have a mechanical durability of 98.0% or more, more preferably 99.0% or more.

The feed pellets according to the present invention can be prepared by pelleting a raw material including a kraft pulp by a known method. The shape and size of the feed pellets according to the present invention are not specifically limited, but the diameter of each pellet can be, for example, 2 to 20 mm, preferably 3 to 10 mm. The length of each pellet is preferably, for example, 1 to 200 mm, more preferably 5 to 80 mm, still more preferably 10 to 60 mm, or may be 15 to 45 mm.

Pelleting can be performed by compression molding using a known apparatus. The apparatus for compression molding is not specifically limited, but preferred examples include briquetters (from Kitagawa Corporation), ring die pellet mills (from CPM), and flat die pellet mills (from DALTON CORPORATION), for example.

The feedstuffs for ruminants of the present invention can also assume the form of a pulp sheet. The pulp sheet preferably has a basis weight of 50 to 3000 g/m$^2$, more preferably 100 to 2500 g/m$^2$, especially preferably 150 to 2000 g/m$^2$. On the other hand, the pulp sheet preferably has a thickness of 0.1 to 10 mm, more preferably 0.3 to 8 mm, especially preferably 0.5 to 5 mm. If the sheet has a thickness of less than 0.1 mm, it lacks strength so that it is more likely to be torn as it is successively passed through a wire part, a press part, and a dryer part. If the sheet has a thickness of more than 10 mm, however, it is thick and stronger so that it is difficult to cut or break up. Further, the density of the pulp sheet is not specifically limited, but preferably 0.3 to 1.5 g/cm$^3$, more preferably 0.35 to 1.2 g/cm$^3$, still more preferably 0.4 to 1.0 g/cm$^3$.

The feed sheet for ruminants of the present invention is obtained by, for example, dewatering a slurry containing a pulp having a moisture content of 90% by mass or more successively through a wire part, a press part, and a dryer part. The type of the wire part is not specifically limited, and may be, for example, a long wire as used in Fourdrinier machines, a short wire, a cylinder mould, a twin wire or the like. In the present invention, the wire part is preferably of the twin wire type because of the high dewatering efficiency leading to the efficient preparation of pulp sheets.

The type of press is not specifically limited, and one or a combination of two or more of Twinver presses, Tri-Nip presses, Tri-Vent presses, extended nip presses, shoe presses, tandem shoe presses, baby presses, twin wire presses, heavy duty presses and the like can be used. The press roll is not specifically limited either, and one or a combination of two or more of grooved rolls, suction rolls, plain rolls and the like covered with a rubber, resin or the like can be appropriately selected and used.

The load on the dryer part can be reduced and efficient preparation of a pulp sheet can be achieved by controlling the water content of the pulp sheet having passed through the press part at 35 to 70% by mass or less. The type of dryer is not specifically limited so far as it is designed to blow warm air, and one or a combination of two or more of IR dryers, hot air dryers the like can be used. Cylinder dryers are not preferred because the pulp sheet is unbeaten and too weak to withstand the tension between cylinders. The pulp sheet having passed through the dryer part preferably has a water content of 10 to 25% by mass or less, more preferably 15% by mass or less, in order to reduce losses during transportation for field sales. The lower limit of the water content is not specifically defined, but preferably 10% by mass or more. Water contents of less than 10% by mass are not preferred for energy saving because drying with a dryer must be enhanced.

In one embodiment, the bulk density of the feedstuffs for ruminants of the present invention can be 0.30 to 0.65 g/cm$^3$, or may be 0.31 to 0.60 g/cm$^3$, or 0.32 to 0.55 g/cm$^3$, or 0.33 to 0.50 g/cm$^3$, as determined according to JIS Z 7302-9. Moreover, feedstuffs having such a bulk density can be processed into pellets. If the bulk density is 0.3 g/cm$^3$ or more, feedstuffs assume the form of flakes that are easy to transport, and if it is 0.65 g/cm$^3$ or less, pulp fibers assemble to a moderate extent to improve processability. The moisture content is preferably 10 to 70% by mass, or may be 11 to 65% by mass, or 12 to 60% by mass, or 13 to 55% by mass. If the moisture content is 10 to 70% by mass, pulp fibers assemble to a moderate extent to case molding, but if the moisture content is excessively high, the transportation efficiency is adversely affected by the large amount of water contained and interfiber bonds of pulp are weakened by water so that the pulp readily breaks up. To control the moisture content of pulp, the pulp slurry may be squeezed by using a pressing/compressing apparatus, for example. Pressing/compressing apparatus include, but are not specifically limited to, screw presses, filter presses, belt filter presses, roll presses, centrifugal dehydrators and the like. As used herein, the moisture content can be calculated by the equation below:

$$\text{Moisture content (\% by mass)} = (A-B)/A$$

wherein A represents the mass of pulp before drying, and B represents the mass of pulp after complete drying.

The feedstuffs of the present invention contain a bleached or unbleached kraft pulp, preferably 10% by mass or more, more preferably 50% by weight or more, still more preferably 80% by weight or more of a kraft pulp, or they may consist solely of a kraft pulp. They may also contain other feed ingredients, as appropriate. The kraft pulp preferably has been oxygen-delignified, and preferably has a kappa number of 30 or less, more preferably has a kappa number of 5 to 15, or may have a kappa number of 7 to 13. If the kappa number is 30 or less, ruminants' preference is improved.

The feedstuffs of the present invention contain a kraft pulp (KP), which can be used in combination with other pulps prepared by known pulping processes. For example, both mechanical and chemical pulps can be applied. Mechanical pulps include groundwood pulp (GP), refiner groundwood pulp (RGP), thermomechanical pulp (TMP), chemithermomechanical pulp (CTMP) and the like. Chemical pulps include kraft pulp (KP), dissolving kraft pulp (DKP), sulfite pulp (SP), dissolving sulfite pulp (DSP) and the like. Further, both bleached and unbleached pulps can be used. Among them, preferred are oxygen-delignified chemical pulps, bleached chemical pulps and the like. More preferred are pulps or kraft pulps having a kappa number of 5 or more and less than 15, and especially preferred are oxygen-delignified kraft pulps having a kappa number of 5 or more and less than 15.

In the feedstuffs for ruminants according to the present invention, the pulp may consist of a single pulp or may be a mixture of multiple pulps. For example, a mixture of two or more of chemical pulps (hardwood kraft pulps, softwood kraft pulps, hardwood dissolving kraft pulps, softwood dissolving kraft pulps), or mechanical pulps (groundwood pulps, refiner groundwood pulps, thermomechanical pulps, chemithermomechanical pulps) derived from different sources or prepared by different processes may be used.

Mechanical pulps can contain undisintegrated lumps by preparing them without undergoing any screening process after grinding (in cases of groundwood pulps) or after refining (in cases of refiner groundwood pulps, thermomechanical pulps, and chemithermomechanical pulps).

Wood raw materials that can be used include, for example, hardwoods, softwoods, trysting trees, bamboo, kenaf, bagas and empty fruit brunches obtained after palm oil extraction. Specifically, examples of hardwoods include *Fagus crenata, Tilia japonica, Betula platyphylla, Populus, Eucalyptus, Acacia*, oaks, *Acer pictum* subsp. *mono, Kalopanax seplemlobus*, elms, *Paulownia tomentosa, Mangolia obovata*, willows, *Kalopanax pictus* Nakai, *Quercus phillyraeoides, Quercus serrata, Quercus acutissima, Aesculus turbinata, Zelkova serrata, Betula grossa, Cornus controversa, Fraxinus lanuginosa* f. *serrata* and the like. Examples of softwoods include *Cryptomeria japonica, Picea jezoensis, Larix kaempferi, Pinus thunbergii, Abies Sachalinensis, Pinus parviflora* var. *parviflora, Taxus cuspidata, Thuja standishii, Picea torano, Picea alcokiana, Podocarpus macrophyllus, Abies firma, Chamaecyparis pisifera, Pseudotsuga japonica, Thujopsis dolabrata, Thujopsis dolabrata* var. *hondae, Tsuga sieboldii, Tsuga diversifolia, Chamaecyparis obtusa, Taxus cuspidata, Cephalotaxus harringtonia, Picea jezoensis* var. *hondoensis*, yellow cedar (*Cupressus nootkatensis*), Lawson's cypress (*Chamaecyparis lawsoniana*), Douglas fir (*Pseudotsuga menziesii*), Sitka spruce (*Picea sitchensis*), *Pinus radiata*, eastern spruce, eastern white pine, western larch, western fir, western hemlock, *Larix occidentalis* and the like.

Kraft Pulp

The feedstuffs according to the present invention contain a kraft pulp obtained by kraft cooking of a lignocellulosic raw material, especially preferably contain a wood-derived kraft pulp. Especially in the present invention, feed pellets having a slow digestion rate in the rumen of ruminants to promote rumination in the rumen can be prepared by using a kraft pulp having a Canadian standard freeness (CSF) of 400 ml or more. In preferred embodiments, the Canadian standard freeness of the kraft pulp used in the present invention is 450 ml or more, or may be 500 ml or more or 550 ml or more. If the Canadian standard freeness is 600 ml or less, the resulting feedstuffs are not difficult to digest in the rumen of ruminants. Therefore, the Canadian standard freeness is desirably 400 ml or more and 600 ml or less. Typically, the Canadian standard freeness of the kraft pulp can be reduced by processing with a known beater such as a double disc refiner, a single disc refiner, a conical refiner or a PFI mill or the like.

In the present invention, the average fiber length of the kraft pulp is not specifically limited. In preferred embodiments, the average fiber length can be 0.68 mm or more, or may be 0.70 mm or more in cases of hardwood kraft pulps, while the average fiber length can be 1.50 mm or more, or may be 1.80 mm or more in cases of softwood kraft pulps. Feedstuffs that are more likely to promote rumination in the rumen of ruminants can be prepared by increasing the average fiber length. The average fiber length of the kraft pulp can be controlled by suitably formulating the lignocellulosic raw material because kraft pulps having a longer fiber length can generally be obtained by kraft cooking of wood species having a longer fiber length. For example, pulps having a longer average fiber length can be obtained by preparing a kraft pulp with high proportions of softwood materials because the fiber length of softwoods is often longer than the fiber length of hardwoods.

In preferred embodiments, the kraft pulp used in the present invention has a breaking length of 2.5 to 8.5 km, more preferably 3.0 to 7.5 km. The breaking length refers to the length of a paper strip vertically suspended from one end when it breaks of its own weight, and typically expressed in km. As used herein, the breaking length of a kraft pulp refers to the breaking length of a laboratory sheet having a basis weight of 60 g/m² prepared from the pulp, as determined according to JIS P 8113.

For preparing a kraft pulp from wood chips, the wood chips are fed into a digester together with a cooking liquor and subjected to kraft cooking. Alternatively, they may be subjected to a modified kraft cooking process such as MCC, EMCC, ITC, Lo-solids or the like process. Further, the digester system is not specifically limited, including one-vessel liquor phase, one-vessel steam/liquor phase, two-vessel liquor/steam phase, two-vessel liquor phase or the like system. Thus, the step of impregnating wood chips with an aqueous alkaline solution and holding them described herein may be provided separately from conventional equipment or sites intended for impregnation treatments with cooking liquors. Preferably, the cooked unbleached pulp is washed in a washer such as a diffusion washer after the cooking liquor has been extracted. The ratio of liquor to wood chips can be, for example, 1.0 to 5.0 L/kg, preferably 1.5 to 4.5 L/kg, more preferably 2.0 to 4.0 L/kg.

In the present invention, an alkaline cooking liquor containing 0.01 to 1.5% by mass of a quinone compound based on the bone dry weight of chips may be added to the digester. If the amount of the quinone compound added is less than 0.01% by mass, it is too little to reduce the kappa number of the pulp after cooking so that the relationship between the kappa number and the pulp yield cannot be improved. Moreover, reduction of lumps and reduction in viscosity loss are also insufficient. Even if the amount of the quinone compound added exceeds 1.5% by mass, however, neither further reduction in the kappa number of the pulp after cooking nor improvement in the relationship between the kappa number and the pulp yield is observed.

The quinone compound used is a quinone compound, a hydroquinone compound or a precursor thereof known as the so-called digestion aid, and at least one compound selected from these members can be used. These compounds include, for example, quinone compounds such as anthraquinones, dihydroanthraquinones (e.g., 1,4-dihydroanthraquinone), tetrahydroanthraquinones (e.g., 1,4,4a,9a-tetrahydroanthraquinone, 1,2,3,4-tetrahydroanthraquinone), methylanthraquinones (e.g., 1-methylanthraquinone, 2-methylanthraquinone), methyldihydroanthraquinones (e.g., 2-methyl-1,4-dihydroanthraquinone), and methyltetrahydroanthraquinones (e.g., 1-methyl-1,4,4a,9a-tetrahydroanthraquinone, 2-methyl-1,4,4a,9a-tetrahydroanthraquinone); hydroquinone compounds such as anthrahydroquinones (typically 9,10-dihydroxyanthracene), methylanthrahydroquinones (e.g., 2-methylanthrahydroquinone), dihydroanthrahydroanthraquinones (e.g., 1,4-dihydro-9,10-dihydroxyanthracene) or alkali metal salts thereof (e.g., the disodium salt of an anthrahydroquinone, the disodium salt of 1,4-dihydro-9,10-dihydroxyanthracene); and precursors thereof such as anthrones, anthranols, methylanthrones, and methylanthranols. These precursors have the potential to be converted into quinone compounds or hydroquinone compounds under cooking conditions.

The cooking liquor preferably has an active alkali charge (AA) of 10 to 35% by mass based on the bone dry weight of wood chips. If the active alkali charge is less than 10% by mass, lignins or hemicelluloses are not sufficiently removed, but if it exceeds 35% by mass, the yield decreases or the quality decreases. As used herein, the active alkali charge refers to the total charge of NaOH and $Na_2S$, expressed as the charge of $Na_2O$ obtained by multiplying the charge of NaOH by 0.775 and the charge of $Na_2S$ by 0.795 to convert them into the corresponding charge of $Na_2O$. Further, it preferably has a sulfidity in the range of 20 to 35%. In regions having a sulfidity of less than 20%, delignification is poor, the pulp viscosity decreases, and the percentage of lumps increases.

Kraft cooking preferably takes place in the temperature range of 120 to 180° C., more preferably 140 to 160° C. If the temperature is too low, delignification (reduction in kappa number) is insufficient, but if the temperature is too high, the degree of polymerization (viscosity) of celluloses decreases. Further, the cooking time is preferably 60 minutes or more and 600 minutes or less, more preferably 120 minutes or more and 360 minutes or less, wherein the cooking time as used herein refers to a period of time after the cooking temperature reaches the maximum temperature before the temperature begins to drop. If the cooking time is shorter than 60 minutes, pulping does not proceed, but if it exceeds 600 minutes, the pulp production efficiency decreases, and therefore, either case is not preferred.

In the kraft cooking process according to the present invention, the process temperature and the process time can be selected based on the H-factor (Hf). The H-factor is an indicator of the total amount of heat given to a reaction system during cooking and expressed by the equation below. The H-factor is calculated by integration over time from the instant when chips and water are mixed to the end of cooking. The H-factor is preferably 300 to 2000.

$$Hf = \int \exp(43.20 - 16113/T) dt$$

wherein T represents the absolute temperature at a given instant.

In the present invention, the unbleached pulp obtained after cooking can be subjected to various treatments, as appropriate. For example, the unbleached pulp obtained after kraft cooking can be subjected to a bleaching process.

The pulp obtained after kraft cooking can be subjected to an oxygen delignification process. The oxygen delignification process used in the present invention can be performed by directly applying a known medium consistency method or high consistency method. Preferably, the medium consistency method is performed at a pulp consistency of 8 to 15% by mass, and the high consistency method is performed at 20 to 35% by mass. Alkalis that can be used in the oxygen delignification process include sodium hydroxide and potassium hydroxide, and oxygen gases that can be used include oxygen from cryogenic separation, oxygen from PSA (Pressure Swing Adsorption), oxygen from VSA (Vacuum Swing Adsorption) and the like.

Reaction conditions for the oxygen delignification process include, but are not specifically limited to, an oxygen pressure of 3 to 9 kg/cm², more preferably 4 to 7 kg/cm², an alkali charge of 0.5 to 4% by mass based on the bone dry weight of pulp, a process temperature of 80 to 140° C., a process time of 20 to 180 minutes, and other known conditions. It should be noted that the oxygen delignification process may be performed multiple times in the present invention. Further, the kraft pulp preferably has a kappa number of 5 to 15 after it has been subjected to the oxygen delignification process or the like.

When the kappa number is desired to be further reduced or the brightness is desired to be further improved, the oxygen-delignified pulp is then sent to, for example, a washing step in which it is washed, and then sent to a multistage bleaching step in which it can be subjected to a multistage bleaching process. The multistage bleaching process in the present invention preferably includes, but not specifically limited to, the use of a known bleaching agent such as an acid (A), chlorine dioxide (D), an alkali (E), oxygen (O), hydrogen peroxide (P), ozone (Z), a peracid or the like in combination with a bleaching aid. For example, a multistage bleaching sequence is preferably used, comprising a first stage using a chlorine dioxide bleaching stage (D) or an ozone bleaching stage (Z), a second stage using an alkali extraction stage (E) or a hydrogen peroxide stage (P), and a third and the subsequent stages using chlorine dioxide or hydrogen peroxide. The number of stages subsequent to the second stage is not specifically limited either, but the total number of stages is preferably at most three or four to ensure energy efficiency, productivity and the like. Further, a chelating agent treatment stage using ethylenediaminetetraacetic acid (EDTA), diethylenetriaminepentaacetic acid (DTPA) or the like may be inserted into the multistage bleaching process.

The feed pellets of the present invention can be fed to ruminants in combination with other feedstuffs. Other feed ingredients include roughage feedstuffs (e.g., forages), concentrate feedstuffs (e.g., cereal grains such as maize and wheat, beans such as soybean), wheat bran, rice bran, soy pulp, proteins, fats, vitamins, minerals and the like as well as additives (preservatives, colorants, perfumes, etc.) and the like. These other feed ingredients may be mixed with wood pulp during compression molding.

The feedstuffs used in combination with the feed pellets of the present invention may be in the form of pulp, powder or fluff, but preferably they are compression-molded into the shape of cubes or pellets or the like or they are formed into cut sheets because they are not only readily mixed with other feedstuffs such as maize or forages but also readily transported or handled.

When they are compression-molded into the shape of cubes, they preferably assume the form of cubes of 5 to 50 mm in length×5 to 50 mm in width×5 to 50 mm in height. When they are compression-molded into the shape of pellets, they preferably assume the form of cylinders of 5 to 50 mm in diameter×5 to 80 mm in length. The apparatus for compression molding is not specifically limited, but desirably a briquetter (from Kitagawa Corporation), a ring die pellet mill (from CPM), a flat die pellet mill (from DALTON CORPORATION) or the like.

When they are in the form of sheets, they preferably assume the form of sheet strips of 5 to 50 mm×5 to 50 mm having a basis weight of 300 to 2000 g/m$^2$.

The feedstuffs for ruminants according to the present invention preferably have a water content of 15% or less. When the water content is 15% or less, transportability is improved whereby microbial corrosion can be reduced.

Feeding of the Feed Pellets to Ruminants

The feed pellets of the present invention can be fed to ruminants in combination with other feedstuffs. Other feed ingredients include roughage feedstuffs (e.g., forages), concentrate feedstuffs (e.g., cereal grains such as maize and wheat, beans such as soybean), wheat bran, rice bran, soy pulp, proteins, fats, vitamins, minerals and the like as well as additives (preservatives, colorants, perfumes, etc.) and the like. These other feed ingredients may be mixed with wood pulp during compression molding.

The feed pellets for ruminants according to the present invention preferably have a water content (moisture content) of 15% by mass or less. When the water content is 15% by mass or less, transportability is improved whereby microbial corrosion can be reduced. The water content of the feed pellets may be, for example, 1% by mass or more, or may be adjusted to 5% by mass or more.

EXAMPLES

The following examples further illustrate the present invention, but the present invention is not limited to these examples. It should be noted that the concentration and % values as used herein are based on mass unless otherwise specified, and the numerical ranges are described to include their endpoints.

Experiment 1: Preparation of Feed Pellets Using Kraft Pulps as Raw Materials (Samples 1 to 4: LOKPs)

*Eucalyptus* wood chips having a radius (Φ) of 25.4 mm to 9.5 mm (in an amount equivalent to 300 g on a bone dry basis) were subjected to kraft cooking in an autoclave under the conditions of an active alkali charge of 14%, a sulfidity of 25%, an H-factor of 830, and a liquor-to-wood ratio of 2.5 to give an unbleached hardwood kraft pulp (kappa number: 17.6, ISO brightness: 36.4%).

This unbleached hardwood kraft pulp was washed with tap water and adjusted to a consistency of 10%, and then subjected to oxygen delignification under the conditions of an oxygen charge of 2.1% (based on the bone dry weight of the pulp), and a sodium hydroxide charge of 1.4% (based on the bone dry weight of the pulp) at 100° C. for 60 minutes to give an oxygen-delignified hardwood kraft pulp (LOKP, kappa number: 11.1, ISO brightness: 54.7%).

Further, this unbleached kraft pulp was beaten in a PFI mill (from KUMAGAI RIKI KOGYO Co., Ltd.) (Sample 1: freeness 265 ml, Sample 2: freeness 392 ml, Sample 3: freeness 426 ml, Sample 4: freeness 520 ml).

Then, the oxygen-delignified hardwood kraft pulps (LOKPs) having different freenesses were dehydrated to a moisture content of 30% by weight by using a centrifugal dehydrator (YS-7SSA from Iwatsuki Machinery Co., Ltd.), and then processed in a small ring die pellet mill (having a motor power of 30 kw from California Pellet Mill) through die holes having a diameter Φ of 4.8 mm and an effective thickness of 32 mm to prepare feed pellets. The moisture content of the pellets was adjusted by an air stream dryer.

(Samples 5 to 8: NOKPs)

Chips (having a thickness of about 3 mm) prepared from *Cryptomeria japonica* wood were screened through a sieve to give *Cryptomeria japonica* wood chips having a radius (Q) of 25.4 mm to 9.5 mm. The chips (in an amount equivalent to 300 g on a bone dry basis) were subjected to kraft cooking in an autoclave under the conditions of an active alkali charge of 18.5%, a sulfidity of 25%, an H-factor of 1500, and a liquor-to-wood ratio of 3.2 to give an unbleached softwood kraft pulp (kappa number: 25.5, ISO brightness: 26.3%).

This unbleached softwood kraft pulp was washed with tap water and adjusted to a consistency of 10%, and then subjected to oxygen delignification under the conditions of an oxygen charge of 2.9% (based on the bone dry weight of the pulp), and a sodium hydroxide charge of 2.2% (based on the bone dry weight of the pulp) at 100° C. for 60 minutes to give an oxygen-delignified softwood kraft pulp (NOKP, kappa number: 10.8, ISO brightness: 32.1%).

Further, this unbleached kraft pulp was beaten in a PFI mill (from KUMAGAI RIKI KOGYO Co., Ltd.) (Sample 5: freeness 245 ml, Sample 6: freeness 380 ml, Sample 7: freeness 435 ml, Sample 8: freeness 680 ml).

Then, feed pellets were prepared from the unbleached kraft pulps in the same manner as described for Sample 1 and subjected to various tests.

<Analyses of the Kraft Pulps>

The kraft pulp used for each sample was determined for the Canadian standard freeness (CSF) according to JIS P 8121, the kappa number according to JIS P 8221, and the number average fiber length according to ISO 16065-2. Further, laboratory sheets were prepared according to JIS P 8222: 1998 and determined for the breaking length according to JIS P 8113: 1998.

<Mechanical Durability Test>

The feed pellets described above were evaluated for the mechanical durability of wood pellets according to the "Testing Methods of Mechanical Durability" defined in the Wood Pellet Quality Standards (established Mar. 31, 2011 by Japan Wood Pellet Association). The mechanical durability defined in the Wood Pellet Quality Standards was standardized according to the European Standard EN 15210-1 and refers to the ability of wood pellets to resist powdering when exposed to a mechanical impact. Specifically, the mechanical durability (DU) was determined by the equation below using the pellet durability tester model DT-T (from SANYO TRADING CO., LTD.).

Mechanical durability (%) = $m1/m0 \times 100$ wherein m1: the mass (g) of the sample before tumbling; m0: the mass (g) of the sample after tumbling.

TABLE 1

|  |  |  | Sample | | | |
| --- | --- | --- | --- | --- | --- | --- |
|  |  |  | 1 | 2 | 3 | 4 |
| Properties of pulp | Material type | — | LOKP (Eucalyptus) | LOKP (Eucalyptus) | LOKP (Eucalyptus) | LOKP (Eucalyptus) |
|  | Freeness | ml | 265 | 392 | 426 | 520 |
|  | Fiber length | mm | 0.63 | 0.66 | 0.69 | 0.71 |
|  | Breaking length | km | 7.8 | 7.1 | 6.8 | 2.9 |
|  | Kappa number |  | 11.1 | 11.1 | 11.1 | 11.1 |
|  | Moisture content before pelleting | % | 33.4 | 26.3 | 29.3 | 31.9 |
| Properties of pellets | Mechanical durability | % | 99.3 | 99.6 | 99.5 | 99.3 |
|  | Diameter | mm | 4.8 | 4.8 | 4.8 | 4.8 |
|  | Length | mm | 36 | 29 | 34 | 31 |
|  | Moisture content | % | 12.1 | 16.3 | 13.9 | 15.4 |
|  |  |  | Sample | | | |
|  |  |  | 5 | 6 | 7 | 8 |
| Properties of pulp | Material type | — | NOKP (Cryptomeria) | NOKP (Cryptomeria) | NOKP (Cryptomeria) | NOKP (Cryptomeria) |
|  | Freeness | ml | 245 | 380 | 435 | 680 |
|  | Fiber length | mm | 1.44 | 1.46 | 1.51 | 1.98 |
|  | Breaking length | km | 9.1 | 8.9 | 8.3 | 3.1 |
|  | Kappa number |  | 10.8 | 10.8 | 10.8 | 10.8 |
|  | Moisture content before pelleting | % | 34.1 | 32.1 | 29.9 | 27.5 |
| Properties of pellets | Mechanical durability | % | 99.5 | 99.6 | 99.4 | 99.3 |
|  | Diameter | mm | 4.8 | 4.8 | 4.8 | 4.8 |
|  | Length | mm | 21 | 26 | 31 | 35 |
|  | Moisture content | % | 15.1 | 14.9 | 13.5 | 14.2 |

Experiment 2: Feeding to Ruminants (In-Situ Digestion Test)

The digestibility in the rumen was determined by an in situ method (Journal of Dairy Science, vol. 71, pages 2051-2069, 1988, James E. Nocek).

Into the rumen of a test animal (a cow) were inserted polyester bags (#R1020, polyester, 10 cm×20 cm, average pore diameter 50±15 μm, ANKOM Technology Corp., Fairport, N.Y., USA) containing each sample weighing 5 g (on an air-dry basis). At 2 hours, 4 hours, 8 hours, 24 hours, 48 hours, 72 hours, and 96 hours after the polyester bags were inserted, they were removed from the rumen, and washed with water, and dried to a constant mass at 60° C. to determine the dry matter weight. The same polyester bags containing each feedstuff were prepared except that they were not inserted into the rumen but simply washed with water, and used as samples at a degradation time of 0 hour. Each sample was measured on three different successive days.

As controls, steam-flaked corn (Sample 9: a concentrate feedstuff available from Nakajima Seibaku Kogyo K.K. as steam-flaked corn) and bermudagrass hay (Sample 10: a roughage feedstuff available from Takeda K.K. as Bermuda hay bales produced in U.S.) were inserted into the rumen of the cow and subjected to the digestion test.

Then, the oxygen-delignified hardwood kraft pulps (LOKPs) having different freenesses were dehydrated to the moisture contents shown in the table below using a centrifugal dehydrator (YS-7SSA from Iwatsuki Machinery Co., Ltd.).

TABLE 2

| | | | Sample | | | | | | | | |
|---|---|---|---|---|---|---|---|---|---|---|---|
| | | 1 | 2 | 3 | 4 | 5 | 6 | 7 | 8 | 9 | 10 |
| Raw material | | LOKP | LOKP | LOKP | LOKP | NOKP | NOKP | NOKP | NOKP | Concentrate | Roughage |
| Freeness of pulp (ml) | | 265 | 392 | 426 | 520 | 245 | 380 | 435 | 680 | — | — |
| Mechanical durability of feed pellets | % | 99.6 | 99.5 | 99.3 | 99.4 | 99.6 | 99.3 | 99.3 | 99.5 | — | — |
| In situ dry matter digestibility (%) | 0 hr | 0.0 | 0.0 | 0.0 | 0.0 | 0.0 | 0.0 | 0.0 | 0.0 | 28.6 | 22.5 |
| | 2 hr | 1.1 | 0.7 | 0.0 | 0.0 | 1.9 | 0.1 | 0.0 | 0.0 | 40.5 | 23.5 |
| | 4 hr | 6.8 | 5.6 | 3.0 | 2.1 | 6.9 | 4.5 | 2.3 | 1.7 | 47.2 | 25.4 |
| | 8 hr | 15.6 | 13.7 | 9.1 | 7.9 | 15.6 | 11.6 | 6.1 | 4.5 | 57.2 | 30.2 |
| | 24 hr | 54.7 | 52.1 | 41.8 | 36.3 | 53.3 | 45.7 | 31.2 | 25.4 | 77.6 | 46.7 |
| | 48 hr | 90.1 | 87.2 | 81.8 | 77.8 | 86.1 | 82.3 | 73.3 | 69.1 | 94.8 | 61.3 |
| | 72 hr | 94.9 | 94.2 | 94.0 | 93.1 | 88.9 | 87.5 | 86.6 | 83.9 | 96.9 | 66.6 |

Feed pellets prepared from kraft pulps having a freeness of 400 ml or more were shown to take longer to saccharify than feed pellets prepared from pulps having a freeness of less than 400 ml. The feed pellets according to the present invention seem to contribute to inducing rumination because they can stay in the rumen for a longer period of time.

Further, the final digestibilities of the feed pellets according to the present invention were comparable to those of the feed pellets prepared from kraft pulps having a lower freeness (Samples 1 to 2, and 5 to 6) and the concentrate feedstuff (Sample 9) and higher than that of the roughage feedstuff (Sample 10). This indicates that the feed pellets according to the present invention are converted into energy with high efficiency.

In conclusion, the present invention made it possible to prepare feed pellets for ruminants with high nutritional value and slow digestion rate capable of promoting rumination.

Experiment 3: Preparation of Feedstuffs Using Kraft Pulps as Raw Materials
(LOKPs: Samples 3-1 to 3-7)

*Eucalyptus* wood chips having a radius (Φ) of 25.4 mm to 9.5 mm (in an amount equivalent to 300 g on a bone dry basis) were subjected to kraft cooking in an autoclave under the conditions of an active alkali charge of 14%, a sulfidity of 25%, an H-factor of 830, and a liquor-to-wood ratio of 2.5 to give an unbleached hardwood kraft pulp (kappa number: 17.4, ISO brightness: 34.8%).

This unbleached hardwood kraft pulp was washed with tap water and adjusted to a consistency of 10%, and then subjected to oxygen delignification under the conditions of an oxygen charge of 2.1% (based on the bone dry weight of the pulp), and a sodium hydroxide charge of 1.4% (based on the bone dry weight of the pulp) at 100° C. for 60 minutes to give an oxygen-delignified hardwood kraft pulp (LOKP, kappa number: 11.8, ISO brightness: 53.6%).

Further, this oxygen-delignified hardwood kraft pulp was beaten in a PFI mill (from KUMAGAI RIKI KOGYO Co., Ltd.) to give kraft pulps having various Canadian standard freenesses.

(NOKPs: Samples 3-8 to 3-13)

Chips (having a thickness of about 3 mm) prepared from *Cryptomeria japonica* wood were screened through a sieve to give *Cryptomeria japonica* wood chips having a diameter (Q)) of 25.4 mm to 9.5 mm. The chips (in an amount equivalent to 300 g on a bone dry basis) were subjected to kraft cooking in an autoclave under the conditions of an active alkali charge of 18.5%, a sulfidity of 25%, an HI-factor of 1500, and a liquor-to-wood ratio of 3.2 to give an unbleached softwood kraft pulp (kappa number: 26.1, ISO brightness: 26.6%).

This unbleached softwood kraft pulp was washed with tap water and adjusted to a consistency of 10%, and then subjected to oxygen delignification under the conditions of an oxygen charge of 2.9% (based on the bone dry weight of the pulp), and a sodium hydroxide charge of 2.2% (based on the bone dry weight of the pulp) at 100° C. for 60 minutes to give an oxygen-delignified softwood kraft pulp (NOKP, kappa number: 10.3, ISO brightness: 31.8%).

Further, this oxygen-delignified softwood kraft pulp was beaten in a PFI mill (from KUMAGAI RIKI KOGYO Co., Ltd.) to give kraft pulps having various Canadian standard freenesses.

Then, the oxygen-delignified softwood kraft pulps (NOKPs) having different Canadian standard freenesses were dehydrated to the moisture contents shown in the table below using a centrifugal dehydrator (YS-7SSA from Iwatsuki Machinery Co., Ltd.).

<Analyses of the Kraft Pulps>

The kraft pulp used for each sample was determined for the Canadian standard freeness (CSF) according to JIS P 8121, the kappa number according to JIS P 8221, and the number average fiber length according to ISO 16065-2. Further, the bulk density was determined according to JIS Z 7302-9.

TABLE 3

| | | Sample | | | | | | |
|---|---|---|---|---|---|---|---|---|
| | | 3-1 | 3-2 | 3-3 | 3-4 | 3-5 | 3-6 | 3-7 |
| Raw material | | Hardwood | Hardwood | Hardwood | Hardwood | Hardwood | Hardwood | Hardwood |
| Fiber length | mm | 0.4 | 0.5 | 0.6 | 0.7 | 0.7 | 0.7 | 0.7 |
| Moisture content | % | 30 | 30 | 30 | 30 | 15 | 8 | 73 |
| Freeness | ml | 260 | 385 | 425 | 530 | 530 | 530 | 530 |
| Bulk density | g/cm$^3$ | 0.36 | 0.37 | 0.37 | 0.35 | 0.32 | 0.28 | 0.68 |

| | | Sample | | | | | |
|---|---|---|---|---|---|---|---|
| | | 3-8 | 3-9 | 3-10 | 3-11 | 3-12 | 3-13 |
| Raw material | | Softwood | Softwood | Softwood | Softwood | Softwood | Softwood |
| Fiber length | mm | 1.1 | 1.5 | 2.1 | 2.1 | 2.1 | 2.1 |
| Moisture content | % | 30 | 30 | 30 | 15 | 8 | 73 |
| Freeness | ml | 375 | 425 | 670 | 670 | 670 | 670 |
| Bulk density | g/cm$^3$ | 0.50 | 0.48 | 0.51 | 0.38 | 0.29 | 0.73 |

Experiment 4: Feeding to Ruminants (In-Situ Digestion Test)

The digestibility in the rumen was determined by an in situ method (Journal of Dairy Science, vol. 71, pages 2051-2069, 1988, James E. Nocek).

Into the rumen of a test animal (a cow) were inserted polyester bags (#R1020, polyester, 10 cm×20 cm, average pore diameter 50±15 Gm, ANKOM Technology Corp., Fairport, N.Y., USA) containing each feedstuff prepared in Experiment 3 weighing 5 g (on an air-dry basis). At 2 hours, 4 hours, 8 hours, 24 hours, 48 hours, 72 hours, and 96 hours after the polyester bags were inserted, they were removed from the rumen, and washed with water, and dried to a constant mass at 60° C. to determine the dry matter weight. The same polyester bags containing each feedstuff were prepared except that they were not inserted into the rumen but simply washed with water, and used as samples at a degradation time of 0 hour. Each sample was measured on three different successive days.

As controls, steam-flaked corn (Sample 3-14: a concentrate feedstuff available from Nakajima Seibaku Kogyo K.K. as steam-flaked corn) and bermudagrass hay (Sample 3-15: a roughage feedstuff available from Takeda K.K. as Bermuda hay bales produced in U.S.) were inserted into the rumen of the cow and subjected to the digestion test.

Feed raw materials prepared from kraft pulps having a Canadian standard freeness of 400 ml or more were shown to take longer to saccharify than feed raw materials prepared from kraft pulps having a Canadian standard freeness of less than 400 ml. The feed raw materials according to the present invention seem to contribute to inducing rumination because they can stay in the rumen for a longer period of time.

Further, the final digestibilities of the feedstuffs according to the present invention were comparable to those of the feedstuffs prepared from kraft pulps having a lower Canadian standard freeness and the concentrate feedstuff (Sample 3-14) and higher than that of the roughage feedstuff (Sample 3-15). This indicates that the feed raw materials according to the present invention are converted into energy with high efficiency.

In conclusion, the feedstuffs according to the present invention achieved high nutritional value and slow digestion rate and they could promote rumination.

Experiment 5: Processability into Pellets

Samples 3-4 to 3-7, and 3-10 to 3-13 prepared in Experiment 3 were processed into pellets using a small ring die pellet mill (having a motor power of 30 kw from California Pellet Mill) (through die holes having a diameter Φ of 4.8 mm and an effective thickness 32 mm), and the resulting pellets were evaluated for mechanical durability in the same manner as described in Experiment 1.

TABLE 4

| | | Sample | | | | | | | | |
|---|---|---|---|---|---|---|---|---|---|---|
| | | 3-1 | 3-2 | 3-3 | 3-4 | 3-8 | 3-9 | 3-10 | 3-14 | 3-15 |
| Raw material | | Hardwood | Hardwood | Hardwood | Hardwood | Softwood | Softwood | Softwood | Concentrate | Roughage |
| Fiber length | mm | 0.4 | 0.5 | 0.6 | 0.7 | 1.1 | 1.5 | 2.1 | — | — |
| Moisture content | % | 30 | 30 | 30 | 30 | 30 | 30 | 30 | — | — |
| Freeness | ml | 260 | 385 | 425 | 530 | 375 | 425 | 670 | — | — |
| Bulk density | g/cm$^3$ | 0.36 | 0.37 | 0.37 | 0.35 | 0.50 | 0.48 | 0.51 | — | — |
| In situ test dry matter digestibility (%) | 0 Time | 0 | 0 | 0 | 0 | 0 | 0 | 0 | 28.6 | 22.5 |
| | 2 | 1.2 | 0.6 | 0 | 0 | 0 | 0 | 0 | 40.5 | 23.5 |
| | 4 | 6.7 | 6.1 | 2.3 | 2.0 | 4.0 | 2.1 | 1.4 | 47.2 | 25.4 |
| | 8 | 16.9 | 14.5 | 7.8 | 5.3 | 12.1 | 5.9 | 4.1 | 57.2 | 30.2 |
| | 24 | 58.1 | 55.1 | 36.6 | 32.6 | 48.1 | 29.8 | 22.2 | 77.6 | 46.7 |
| | 48 | 90.2 | 88.3 | 74.9 | 69.1 | 81.9 | 72.2 | 61.8 | 94.8 | 61.3 |
| | 72 | 93.6 | 92.4 | 80.8 | 79.6 | 85.2 | 81.6 | 77.1 | 96.9 | 66.6 |
| | 96 | 94.6 | 95.7 | 94.3 | 93.2 | 88.5 | 87.5 | 86.9 | 97.2 | 68.2 |

TABLE 5

| | | Sample | | | | | | | |
|---|---|---|---|---|---|---|---|---|---|
| | | 3-4 | 3-5 | 3-6 | 3-7 | 3-10 | 3-11 | 3-12 | 3-13 |
| Moisture content | % | 30 | 15 | 8 | 73 | 30 | 15 | 8 | 73 |
| Pelleting | | o | o | Failed due to overload | o | o | o | Failed due to overload | o |
| Mechanical durability | % | 99.1 | 99.0 | — | 86.3 | 98.5 | 98.3 | — | 84.9 |

The results are shown in Table 5, demonstrating that Sample 3-4 (moisture content: 30%) and Sample 3-5 (moisture content: 15%) were superior to Sample 3-6 (moisture content: 8%) and Sample 3-7 (moisture content: 73%) in processability into pellets. Similarly, Sample 3-10 (moisture content: 30%) and Sample 3-11 (moisture content: 15%) were shown to be superior feed raw materials as compared with Sample 3-12 (moisture content: 8%) and Sample 3-13 (moisture content: 73%) in processability into pellets.

The invention claimed is:

1. A process for preparing a feed pellet for ruminants containing a kraft pulp derived from a wood material, wherein the kraft pulp comprises an oxygen-delignified kraft pulp having a kappa number of 5 to 15, a Canadian standard freeness of 400 ml or more and 600 ml or less; the wood material comprises hardwoods and/or softwoods; and the pellet has a mechanical durability of 97.5% by mass or more, comprising:
   beating the oxygen-delignified kraft pulp using a beater to Canadian Standard Freeness of 400 ml or more and 600 ml or less; controlling a moisture content of the oxygen-delignified kraft pulp to 15 to 35% by mass; and pressing/compressing the kraft pulp having a moisture content of 15 to 35% by mass to obtain the feed pellet.

2. The process of claim 1, wherein the kraft pulp before comprising pressing/compressing has a bulk density of 0.30 to 0.65 g/cm³.

3. The process of claim 2, which further comprises a step of drying the pellet to a water content of less than 15%.

4. The process of claim 1, wherein the feed pellet has a length of 15 to 45 mm and a diameter of 3 to 10 mm.

5. The process of claim 1, wherein the wood material comprises *Eucalyptus* wood and/or *Cryptomeria japonica* wood.

6. The process of claim 1, which further comprises a step of subjecting the kraft pulp to an oxygen-delignification process.

7. The process of claim 1, which further comprises a step of drying the pellet to a water content of less than 15%.

8. The process of claim 1, wherein the wood material comprises hardwoods having an average fiber length of 0.68 mm or more and/or softwoods having an average fiber length of 1.50 mm or more.

9. The process of claim 1, wherein the wood material comprises softwoods having an average fiber length of 1.50 mm or more.

10. The process of claim 1, wherein the wood material comprises *Cryptomeria japonica* wood.

11. The process of claim 1, wherein the wood material consists essentially of hardwoods, softwoods, or both.

12. The process of claim 1, wherein the wood material is essentially free of bamboo.

13. The process of claim 1, wherein the beater is a double disc refiner, a single disc refiner, a conical refiner or a PFI mill.

14. The process of claim 1, wherein the kraft pulp has a kappa number of 7 to 13.

* * * * *